(12) United States Patent
Keller

(10) Patent No.: US 11,008,230 B2
(45) Date of Patent: May 18, 2021

(54) EXCHANGE BASED-WATER TREATMENT

(71) Applicant: Don Keller, Indianapolis, IN (US)

(72) Inventor: Don Keller, Indianapolis, IN (US)

( * ) Notice: Subject to any disclaimer, the term of this patent is extended or adjusted under 35 U.S.C. 154(b) by 117 days.

(21) Appl. No.: 16/298,152

(22) Filed: Mar. 11, 2019

(65) Prior Publication Data
US 2019/0202716 A1 Jul. 4, 2019

Related U.S. Application Data

(62) Division of application No. 14/147,049, filed on Jan. 3, 2014, now abandoned.

(60) Provisional application No. 61/751,342, filed on Jan. 11, 2013.

(51) Int. Cl.
*C02F 1/42* (2006.01)
*B01J 49/08* (2017.01)
*B01J 49/85* (2017.01)

(52) U.S. Cl.
CPC .............. *C02F 1/42* (2013.01); *B01J 49/08* (2017.01); *B01J 49/85* (2017.01); *C02F 2001/422* (2013.01); *C02F 2001/425* (2013.01); *C02F 2209/005* (2013.01); *C02F 2209/06* (2013.01); *C02F 2209/10* (2013.01); *C02F 2303/16* (2013.01)

(58) Field of Classification Search
None
See application file for complete search history.

(56) References Cited

U.S. PATENT DOCUMENTS

| | | |
|---|---|---|
| 3,475,330 A | 10/1969 | Gilles |
| 3,482,697 A | 12/1969 | Tremont et al. |
| 4,855,043 A | 8/1989 | Dalton |
| 5,271,837 A | 12/1993 | Discepolo et al. |

*Primary Examiner* — Matthew O Savage
(74) *Attorney, Agent, or Firm* — McClure, Qualey & Rodack, LLP

(57) ABSTRACT

A water treatment system comprising an ion exchange vessel, a cationic resin located within the ion exchange vessel, and an anionic resin located within the ion exchange vessel.

17 Claims, 2 Drawing Sheets

EXCHANGE BASED-WATER TREATMENT

CROSS REFERENCE TO RELATED APPLICATIONS

This application is a divisional of U.S. patent application Ser. No. 14/147,049, filed Jan. 3, 2014, which claims the benefit of U.S. provisional patent application Ser. No. 61/751,342, filed 2013 Jan. 11, by Keller, having the title "Di-Ionic Synergy Exchange Unit and Method of Use," which is incorporated herein by reference in its entirety.

BACKGROUND

Field of the Disclosure

The present disclosure relates generally to water treatment and, more particularly, to exchange-based water treatment.

Description of Related Art

Water quality is important in many different sectors, ranging from agricultural applications to industrial applications. As such, water quality and water conservation have become increasingly important. Depending on the context, water treatment processes purify or conserve water using one or more known processes. Despite these known processes, there are continuing efforts that are directed to water treatment.

SUMMARY

The present disclosure provides systems and methods for treating water. In particular, the present disclosure is directed to exchange-based water treatment systems and methods. Some embodiments of exchange-based water treatment systems comprise an ion exchange vessel having both a cationic resin and an anionic resin.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
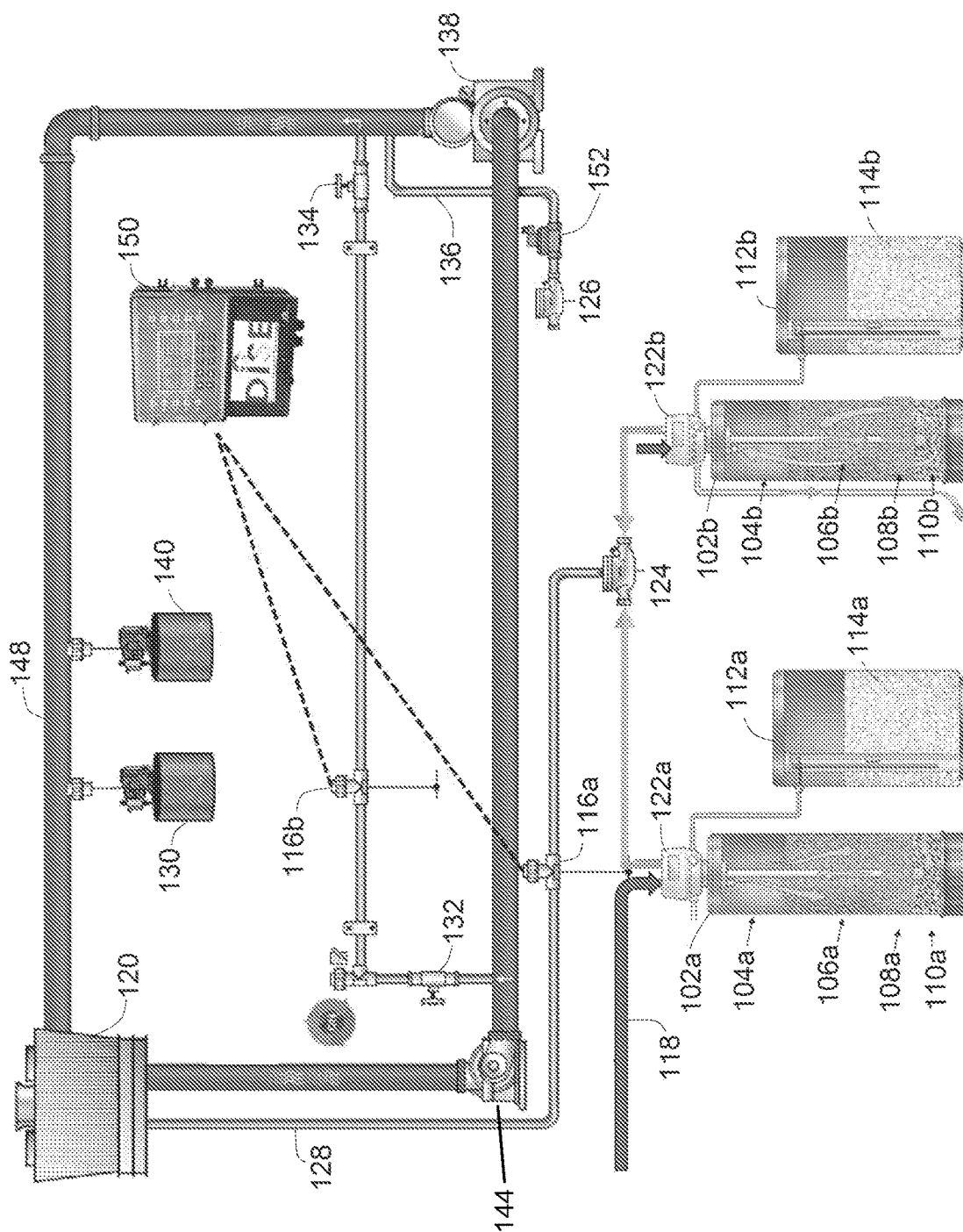
FIG. 1 is a diagram showing one embodiment of an exchange-based water treatment system.

Insofar as water quality affects many different sectors, ranging from agricultural applications to industrial applications, water quality and water conservation have become increasingly important. Water treatment processes typically purify or conserve water using one or more known processes. Some exchange-based water treatment systems perform water-softening processes and de-alkalization processes using ion-based resins.

Conventional ion-based resins employ two separate vessels, namely, a cation exchange vessel and a separate anion exchange vessel. The cation exchange vessel often uses a sodium zeolite resin for cationic exchange that results in "softening" of water. Due to the cationic exchange mechanism, the sodium zeolite resins are designated as cationic resins. Next, the anion exchange vessel often uses a sodium-chloride-based de-alkalization and, because of the anionic exchange mechanism, the de-alkalization resins are denoted as anionic resins.

Unfortunately, because these conventional two-vessel systems employ separate vessels for the cationic softening and the anionic de-alkalization, separate measurements are employed for each vessel when measuring effectiveness of water treatment. In other words, one measurement is taken at the output of the cationic vessel to determine the effectiveness of the water softening process, while another measurement is taken at the output of the anionic vessel to determine the effectiveness of the de-alkalization process. Additionally, because two separate vessels are used, each vessel is independently coupled to its own regenerant. For example, the sodium zeolite cationic exchange unit is regenerated by a salt regenerant, while the sodium chloride anionic exchange unit is regenerated by a separate regenerant that comprises salt and caustic chemicals.

To remedy these and other deficiencies that are associated with these two-vessel systems, the present disclosure provides embodiments of exchange-based water treatment systems where cationic exchange and anionic exchange occurs in a single vessel. For example, one embodiment of the system comprises a vessel having both a cationic resin and an anionic resin. By holding the cationic resin and the anionic resin in the same vessel, the water quality can be measured at the output of the vessel without the need to perform measurements at two separate vessel outputs. Additionally, by holding the cationic resin and the anionic resin in the same vessel, the two resins can be regenerated using a single regenerant. As one having skill in the art will appreciate, the single-vessel embodiment eliminates several of the deficiencies that are associated with conventional two-vessel systems.

Having provided a general overview of one embodiment of an exchange-based water treatment system, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing one embodiment an exchange-based water treatment system. In particular, FIG. 1 shows a water treatment system with two ion exchange vessels 102a, 102b (collectively, 102), each with its own regenerant tank 114a, 114b (collectively 114). Preferably, the regenerant tank 114 is a brine tank that holds non-caustic regenerants, such as salt. The ion exchange vessel 102 comprises a cationic resin 106a, 106b (collectively 106), an anionic resin 108a, 108b (collectively 108), gravel 110a, 110b (collectively 110), and freeboard space 104a, 104b (collectively 104). As one can appreciate, the ion exchange vessel 102 can operate in either an up-flow configuration or a down-flow configuration. However, in preferred embodiments, the ion exchange vessel 102 operates in a down-flow configuration when it is online, and operates in an up-flow configuration during regeneration of the ionic resins 106, 108.

As shown in FIG. 1, a valve 122*a*, 122*b* (collectively 122) is located at the top of the ion exchange vessel 102. The valve 122 is operatively coupled to an input pipe 118, which carries influent city water to the ion exchange vessel 102 through the valve 122, and a make-up water pipe, which carries ejected make-up water from the ion exchange vessel 102. The water that has been treated within the ion exchange vessel 102 is designated as the make-up water.

In a preferred down-flow operation, contents of the ion exchange vessel 102 are layered so that the gravel 110 bed resides at the bottom of the ion exchange vessel 102, the anionic resin 108 bed is layered atop the gravel 110 bed, the cationic resin 106 bed is layered atop the anionic resin 108 bed, and the freeboard space 104 occupies an upper portion of the ion exchange vessel 102. Consequently, when operating in the down-flow configuration, the influent city water is carried through the input pipe 118 and the valve 122 into the ion exchange vessel 102. The influent city water enters the freeboard space 104 and filters through the cationic resin 106 bed. The cationic resin 106 softens the city water through a cationic exchange process, preferably using a sodium zeolite resin or other zeolite-based resin. This softening process removes hard ions, such as magnesium and calcium, from the city water, thereby producing softened water.

The softened water next filters through the anionic resin 108 bed, which de-alkalizes the softened water through an anionic exchange process, preferably using a chloride-based resin or other similar de-alkalizer resin. The de-alkalization process removes bicarbonates, nitrates, and sulfates, thereby producing de-alkalinized water. In sum, once the city water has filtered through both the cationic resin 106 bed and the anionic resin 108 bed, the resulting treated water is both softened and de-alkalinized within the same ion exchange vessel 102. Depending on the properties of the influent city water, the amount of cationic resin 106 and the amount of anionic resin 108 can be altered to accommodate an optimal proportion of ionic resins 106, 108. In a preferred embodiment, without a priori knowledge of the city water properties, the cationic-resin-to-anionic-resin ratio is approximately four-to-one by volume. Stated differently, for a water flow rate of approximately five (5) gallons per hour to approximately seventy (70) gallons per hour, approximately four (4) cubic feet of anionic resin 108, approximately sixteen (16) cubic feet of cationic resin 106 (which is approximately four (4) times the volume of anionic resin 108), and approximately four hundred and fifty (450) pounds of gravel 110 were sufficient to properly treat the city water. For accurate measurements of water quality, a flow rate of approximately sixty (60) to seventy (70) gallons per hour is preferred, but not required.

The softened and de-alkalized water next filters through the gravel 110 bed and is then ejected through the valve 122 as effluent make-up water. The effluent make-up water is carried to a cooling tower 120 (or other desired destination) through a make-up water pipe 128. The system also comprises a make-up water probe 116*a*, 116*b* (collectively 116) that is operatively coupled to the make-up water pipe 128. Although different types of probes may be used to measure different properties of the effluent make-up water, the make-up water probe 116, in preferred embodiments, measures a level of total dissolved solids (TDS). For other embodiments, the make-up water probe 116 measures pH of the effluent make-up water. As shown in FIG. 1, the make-up water probes 116 are operatively coupled to a controller 150, which receives the measurement signals (which are indicative of the TDS, pH, or other properties of the make-up water) from the make-up water probes 116.

For some embodiments, the controller 150 collects data that shows performance characteristics of both the cationic resin 106 bed and the anionic resin 108 bed. This can be accomplished graphically by measuring TDS levels (or pH levels, etc.) as a function of water volume through the ion exchange vessel 102. In some preferred embodiments, the controller 150 is remotely accessible, thereby permitting remote monitoring of water quality. Thus, the ability to remotely monitor the performance characteristics of the ion exchange vessel 102 permits greater control over the water treatment process, and tighter tolerances throughout the water treatment process.

The particular embodiment of FIG. 1 shows the anionic resin 108 bed interfacing directly with the cationic resin 106 bed. However it should be appreciated that a permeable membrane can be interposed between the two beds to reduce mixing and maintain a clearer boundary between the two resins 106, 108. This may be beneficial if the flow rate during regeneration (in an up-flow configuration) is high enough to cause turbulence within the ion exchange vessel 102. However, under normal operation and normal regeneration, the flow rates should be sufficiently low that these types of issues will be avoided.

As one can appreciate, one of the major goals for cooling tower systems, such as those for air conditioning or process water cooling, is reducing water consumption by cycling water concentrations. However, in addition to reducing water consumption, other major concerns include controlling corrosion, controlling biological growths, and reducing scaling (or hard mineral deposits) that can increase energy and maintenance costs. By providing both the cationic resin 106 and the anionic resin 108, the system of FIG. 1 reduces scaling potential by exchanging scale-producing ions with more soluble ions, such as sodium ions and chloride ions. Additionally, by creating higher water concentrations in cooling towers, the system of FIG. 1 provides for near-zero blow-down approaches, which permit discharge of non-toxic water and chemicals.

Continuing with the embodiment of FIG. 1, the system further comprises process equipment 138 (e.g., chiller, flat plates, steam boilers, etc.), a bleed-off line 136 that leads to a bleed-off valve 152 that is coupled to a bleed-off register meter 126. Also, at the pressure side of a circulating pump 144, the make-up water can be branched off to a secondary line with ball valves 132, 134. This secondary line comprises a probe 116*b*, which can also be used to measure water quality.

Several unexpected result are achieved with the system of FIG. 1. First is that the system allows water pH levels to be elevated by controlling alkalinity cycling, thereby facilitating control of biological growths. For example, biological growths are pH-dependent, with the normal range of growth being between a pH of approximately 5 and approximately 9, and very few species of bacteria surviving below a pH of approximately 2 or above a pH of approximately 10. By controlling alkalinity cycling, the embodiment of FIG. 1 controls the pH levels and brings the pH to approximately 9.0 to approximately 9.5 during some phases of the treatment cycle. This high pH level attenuates biological growths in the treated make-up water. However, out of an abundance of caution, the system can also include a chemical injection pump 130 that is operatively coupled to a water return pipe 148 (or even a second chemical injection pump 140 to add a different chemical treatment to the make-up water). Thus, in addition to alkalinity cycling, the chemical injection pump 130 injects a biocide or other chemical into the return pipe 148, which further arrests biological growths or reduces bio-accumulations. It should be noted that the water at the cooling tower (or other end-point) is designated as process water, which comprises the treated make-up water that is ejected by the ion exchange vessel 102. In other words, additional chemical treatments can be applied to the make-up water to further treat or process the water at the cooling tower, hence, the designation of the water at the cooling tower being process water.

Second, better make-up water quality results in improved corrosion control. For example, by using anodic corrosion agents such as orthophosphates and nitrites, a thin film of gamma iron oxide forms on the inner surface of the pipes. This thin film works synergistically with the water treatment process as described above. Consequently, corrosion resistance is improved for both steel and copper components of the cooling tower systems and boilers (condensate lines).

Third, by using non-caustic chemicals, which proved to be effective in regenerating both the anionic resin 108 and the cationic resin 106, the system of FIG. 1 resulted in a more environmentally-friendly process than conventional water treatment systems, and also resulted in reduced waste of water. By way of example, the system of FIG. 1 realizes approximately 600,000 gallons of water saved over an eight (8) month period.—This will reduce water consumption by sewer reductions and overall water use by the local municipalities.

Figure 2:
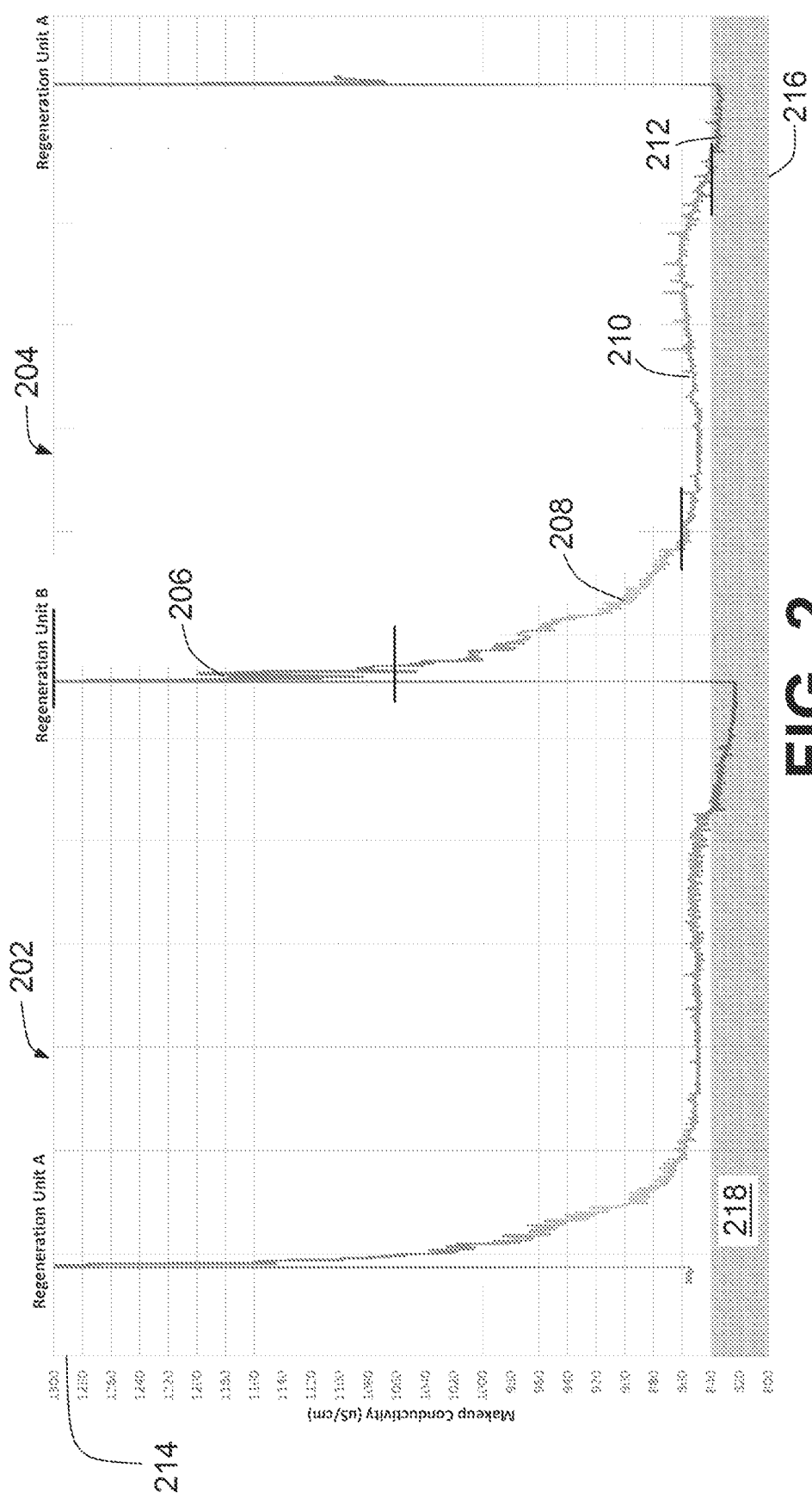
FIG. 2 is a graph showing water quality as a function of volume of processed water for one embodiment of an exchange-based water treatment system.

FIG. 2 is a graph showing water quality as a function of volume of processed water for one embodiment of an exchange-based water treatment system. Specifically, the graph of FIG. 2 shows make-up conductivity 214 (in units of micro-Siemans (uS) per centimeter (cm)) plotted as a function of water volume 216 through the ion exchange vessel 102 (FIG. 1). The conductivity 214 correlates to a concentration of total dissolved solids (TDS) in the water. FIG. 2 shows an example graph for two separate ion exchange vessels (labeled as Regeneration Unit A 202 and Regeneration Unit B 204). Insofar as both graphs are substantially similar, various components of the graph for Regeneration Unit B 204 are discussed, and discussion of Regeneration Unit A 202 is intentionally omitted here.

With this in mind, the graph of Regeneration Unit B 204 comprises four distinct segments, each of which reflects a different exchange process that occurs through the processing of approximately 20,800 gallons of Indianapolis, Ind. city water.

The first segment 206 reflects the regeneration of units. Consequently, the first segment 206 begins with a vertical spike (exceeding 1300 uS/cm), which reflects the regeneration of the resins and proceeds through an exponential decay, indicating the efficiency of the rinse cycle from 10 to 13 minutes. Immediately following the first segment 206 is a second segment 208, which reflects both the water softening and de-alkalization process, during which time magnesium, calcium, bicarbonates, sulfates, and nitrates are removed from the water. The second segment 208 exhibits a conductivity that drops off from approximately 1060 uS/cm to approximately 860 uS/cm. It should be noted that approximately 2,400 gallons of water flow through the system during the first segment 206 and the second segment 208.

The third segment 210 reflects the treated water, which is softened only. No de-alkalization typically occurs during this phase and allows for alkalinity cycling. In other words, this is the operational region where the treated water is supplied to the cooling tower or other desired application. This operational region occupies the majority of the water flow-through (approximately 17,000 gallons). If the slope 208 occurs, the anodic resin is regenerated which indicates the cationic exchange will be realized and the units are properly regenerated.

The final segment 212 reflects hardness breakthrough, where the water reaches its untreated level 218 after much of the cationic resins are depleted. At this point, the ion exchange vessel must be regenerated. Service runs of the units were extended to extrapolate the hardness exhaustion breakthrough noted on graph segment 212 (FIG. 2).

To the extent that the graph of FIG. 2 has a distinct shape, one can appreciate that different degrees of deviation from this shape may be indicative of problems or failures in the water treatment system. It should also be appreciated that different influent water sources can have different properties that result in different characteristic curves. However, once a baseline is acquired for any given influent water source, deviations from that baseline can be monitored to gauge system performance.

As indicated with reference to FIG. 1, providing probes 116 and a controller 150 that can measure TDS, pH, or other water characteristics in near-real time (or at a sufficiently high temporal resolution) permits high-quality measurement of water quality. Furthermore, providing the ability to remotely monitor water quality (by using these types of characteristic curves) also saves costs that are associated with manpower and conventional monitoring equipment.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

The invention claimed is:

1. A method for treating water in an exchange-based water treatment system, the system including:
   an input pipe to carry city water;
   an ion exchange vessel mechanically coupled to the input pipe, the ion exchange vessel to receive the city water, the ion exchange vessel to produce treated make-up water from the received city water, the make-up water being softened water, the make-up water being de-alkalized water;
   a cationic resin located within the ion exchange vessel, the cationic resin to soften the city water through a cationic exchange process, the cationic resin being a sodium zeolite resin;
   an anionic resin located within the ion exchange vessel, directly below the cationic resin, the anionic resin to de-alkalize the softened water, the anionic resin being a chloride-based resin;
   a valve located on the ion exchange vessel, the valve to control ejection of the treated make-up water from the ion exchange vessel;
   a make-up water pipe mechanically coupled to the valve, the make-up water pipe to carry the ejected make-up water; and
   a make-up water probe operatively coupled to the make-up water pipe, the make-up water probe to measure a level of total dissolved solids (TDS)
   a regenerant tank operatively coupled to the valve on the ionic exchange tank; and regenerant located within the regenerant tank, the regenerant being a salt, the regenerant to regenerate the cationic resin, the regenerant to regenerate the anionic resin, in which the method comprises the steps of:

pumping the city water through said ion exchange vessel, said water flowing in a down-flow through said cationic resin and next through said anionic resin thereby causing depletion of said resins, and, after said resins are depleted, pumping city water in an up-flow through said anionic resin and next through said cationic resin; and pumping said regenerant in a down flow through said cationic resin and said anionic resin, whereby said resins are regenerated.

2. The method of claim 1, the ion exchange vessel having a cationic-resin-to-anionic-resin ratio that is approximately four-to-one by volume.

3. The method of claim 1, the cationic resin forming a cationic resin bed, the anionic resin forming an anionic resin bed, the anionic resin bed directly interfacing with the cationic resin bed.

4. The method of claim 1, further comprising:

a controller operatively coupled to the make-up water probe, the controller to receive a measurement signal from the make-up water probe, the measurement signal being indicative of the TDS in the make-up water.

5. The method of claim 1, further comprising a cooling tower mechanically coupled to the make-up water pipe, the cooling tower to receive the make-up water from the ion exchange vessel.

6. A method for treating water in an exchange-based water treatment system, the system including:

an ion exchange vessel;

an input on the ion exchange vessel, the input to receive city water;

a gravel bed on the bottom of said vessel;

an anionic resin bed located within the ion exchange vessel on top of said gravel bed, the anionic resin bed to produce de-alkalized water;

a cationic resin bed located within the ion exchange vessel directly on top of said anionic resin bed, the cationic resin bed to produce softened water; and an output on the ion exchange vessel, the output to eject effluent water, the effluent water being the softened and de-alkalized water, in which the method comprises the steps of:

pumping the city water through said ion exchange vessel, said water flowing in a down-flow through said cationic resin and next through said anionic resin thereby causing depletion of said resins, and, after said resins are depleted, pumping city water in an up-flow through said anionic resin and next through said cationic resin; and pumping a regenerant solution in a down-flow through said cationic resin and said anionic resin, whereby said resins are regenerated.

7. The method of claim 6, the cationic resin bed directly interfacing the anionic resin bed.

8. The method of claim 7, the anionic resin bed to produce de-alkalized water from the softened water.

9. The method of claim 6, the cationic resin bed being four times greater by volume than the anionic resin bed.

10. The method of claim 6, the cationic resin bed comprising a zeolite resin.

11. The method of claim 6, the anionic resin bed comprising a de-alkalizer resin.

12. The method of claim 6, further comprising:

a probe operatively coupled to the output, the probe to measure a property of the effluent water.

13. The method of claim 12, the probe to measure a level of total dissolved solids (TDS).

14. The method of claim 12, the probe to measure a level of total dissolved solids (TDS) as a function of water volume through the ion exchange vessel.

15. The method of claim 12, the probe being a pH probe.

16. The method of claim 12, further comprising:

a controller operatively coupled to the probe, the controller to receive a measurement signal from the probe, the controller being remotely accessible.

17. The method of claim 16, the controller to collect data, the data being indicative of cationic-resin-bed performance, the data being indicative of anionic-resin-bed performance.

* * * * *